(12) United States Patent
Koningstein et al.

(10) Patent No.: US 10,580,033 B2
(45) Date of Patent: Mar. 3, 2020

(54) SUGGESTING AND/OR PROVIDING TARGETING CRITERIA FOR ADVERTISEMENTS

(71) Applicant: Google Inc., Mountain View, CA (US)

(72) Inventors: Ross Koningstein, Atherton, CA (US); Valentin Spitkovsky, Palo Alto, CA (US); Georges Harik, Palo Alto, CA (US); Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 514 days.

(21) Appl. No.: 15/596,210

(22) Filed: May 16, 2017

(65) Prior Publication Data

US 2017/0249662 A1    Aug. 31, 2017

Related U.S. Application Data

(63) Continuation of application No. 13/784,401, filed on Mar. 4, 2013, now abandoned, which is a
(Continued)

(51) Int. Cl.
*G06Q 30/00* (2012.01)
*G06Q 30/02* (2012.01)
(Continued)

(52) U.S. Cl.
CPC ....... *G06Q 30/0251* (2013.01); *G06F 16/316* (2019.01); *G06F 16/334* (2019.01);
(Continued)

(58) Field of Classification Search
CPC .................................. G06Q 30/0207–30/0277
(Continued)

(56) References Cited

U.S. PATENT DOCUMENTS

| | | |
|---|---|---|
| 5,369,577 A | 11/1994 | Kadashevich et al. |
| 5,724,521 A | 3/1998 | Dedrick |

(Continued)

FOREIGN PATENT DOCUMENTS

| | | |
|---|---|---|
| GB | 2378775 | 2/2003 |
| JP | 08-171569 | 7/1996 |

(Continued)

OTHER PUBLICATIONS

Office Action for Brazilian Patent Application No. PI0418256-1, dated Dec. 6, 2017, 5 pages (Machine Translation).
(Continued)

*Primary Examiner* — Michael Bekerman
(74) *Attorney, Agent, or Firm* — Fish & Richardson P.C.

(57) ABSTRACT

Keyword suggestions that are category-aware (and field-proven) may be used to help advertisers better target the serving of their ads, and may reduce unused ad spot inventory. The advertiser can enter ad information, such as a creative, a landing Webpage, other keywords, etc. for example. A keyword facility may use this entered ad information as seed information to infer one or more categories. It may then request that the advertiser confirm or deny some basic feedback information (e.g., categories, Webpage information, etc.). For example, an advertiser may be provided with candidate categories and may be asked to confirm (e.g., using checkboxes) which of the categories are relevant to their ad. Keywords may be determined using at least the categories. The determined keywords may be provided to the advertiser as suggested keywords, or may automatically populate ad serving constraint information as targeting keywords. The ad server system can run a trial on the determined keywords to qualify or disqualify them as targeting keyword.

18 Claims, 8 Drawing Sheets

Related U.S. Application Data continuation of application No. 10/750,451, filed on Dec. 31, 2003, now Pat. No. 8,392,249.

(51) Int. Cl.
| | |
|---|---|
| *G06F 16/31* | (2019.01) |
| *G06F 16/33* | (2019.01) |
| *G06F 16/35* | (2019.01) |
| *G06F 16/68* | (2019.01) |
| *G06F 16/332* | (2019.01) |

(52) U.S. Cl.
CPC ........ *G06F 16/3322* (2019.01); *G06F 16/355* (2019.01); *G06F 16/686* (2019.01); *G06Q 30/02* (2013.01); *G06Q 30/0201* (2013.01); *G06Q 30/0242* (2013.01); *G06Q 30/0256* (2013.01); *G06Q 30/0277* (2013.01)

(58) Field of Classification Search
USPC ............................................. 705/14.1–14.73
See application file for complete search history.

(56) References Cited

U.S. PATENT DOCUMENTS

| | | | |
|---|---|---|---|
| 5,740,549 A | 4/1998 | Reilly et al. | |
| 5,848,397 A | 12/1998 | Marsh et al. | |
| 5,948,061 A | 9/1999 | Merriman et al. | |
| 5,996,007 A | 11/1999 | Klug et al. | |
| 6,026,368 A | 2/2000 | Brown et al. | |
| 6,044,376 A | 3/2000 | Kurtzman, II | |
| 6,078,914 A | 6/2000 | Redfern | |
| 6,119,098 A | 9/2000 | Guyot et al. | |
| 6,119,101 A | 9/2000 | Peckover | |
| 6,141,658 A | 10/2000 | Mehr et al. | |
| 6,144,944 A | 11/2000 | Kurtzman, II et al. | |
| 6,161,127 A | 12/2000 | Cezar et al. | |
| 6,167,382 A | 12/2000 | Sparks et al. | |
| 6,178,407 B1 | 1/2001 | Lotvin et al. | |
| 6,182,050 B1 | 1/2001 | Ballad | |
| 6,216,129 B1 | 4/2001 | Eldering | |
| 6,236,975 B1 | 5/2001 | Boe et al. | |
| 6,236,977 B1 | 5/2001 | Verba et al. | |
| 6,236,991 B1 | 5/2001 | Frauenhofer et al. | |
| 6,246,994 B1 | 6/2001 | Wolven et al. | |
| 6,269,361 B1 | 7/2001 | Davis et al. | |
| 6,298,348 B1 | 10/2001 | Eldering | |
| 6,308,202 B1 | 10/2001 | Cohn et al. | |
| 6,385,592 B1 | 5/2002 | Angles et al. | |
| 6,393,471 B1 | 5/2002 | Kobata | |
| 6,401,075 B1 | 6/2002 | Mason et al. | |
| 6,560,578 B2 | 5/2003 | Eldering | |
| 6,601,041 B1 | 7/2003 | Brown et al. | |
| 6,647,269 B2 | 11/2003 | Hendrey et al. | |
| 6,651,253 B2 | 11/2003 | Dudkiewicz et al. | |
| 6,654,725 B1 | 11/2003 | Langheinrich et al. | |
| 6,714,975 B1 | 3/2004 | Aggarwal et al. | |
| 6,725,203 B1 | 4/2004 | Seet et al. | |
| 6,745,161 B1 | 6/2004 | Arnold et al. | |
| 6,757,661 B1 | 6/2004 | Blaser et al. | |
| 6,985,882 B1 | 1/2006 | Del Sesto | |
| 7,136,875 B2 | 1/2006 | Anderson et al. | |
| 7,039,599 B2 | 5/2006 | Merriman | |
| 8,392,249 B2 | 3/2013 | Koningstein et al. | |
| 2001/0037377 A1 | 11/2001 | Nakano et al. | |
| 2001/0052000 A1* | 12/2001 | Giacalone, Jr. ........ | G06Q 30/02 705/14.73 |
| 2002/0052894 A1 | 5/2002 | Bourdoncle | |
| 2002/0087404 A1 | 7/2002 | Silkey et al. | |
| 2002/0107735 A1* | 8/2002 | Henkin .............. | G06Q 30/0255 705/14.55 |
| 2002/0107740 A1 | 8/2002 | Abiko | |
| 2002/0165773 A1 | 11/2002 | Natsuno et al. | |
| 2002/0169669 A1 | 11/2002 | Stetson et al. | |
| 2003/0033199 A1 | 2/2003 | Coleman | |
| 2003/0033292 A1 | 2/2003 | Meisel et al. | |
| 2003/0055816 A1 | 3/2003 | Paine et al. | |
| 2003/0093285 A1 | 5/2003 | Colace et al. | |
| 2003/0216930 A1 | 11/2003 | Dunham et al. | |
| 2004/0044576 A1 | 3/2004 | Kurihara et al. | |
| 2004/0107137 A1 | 6/2004 | Skinner | |
| 2005/0076017 A1 | 4/2005 | Rein et al. | |
| 2005/0144067 A1 | 6/2005 | Farahat et al. | |
| 2007/0121848 A1* | 5/2007 | Faber .................... | G06Q 30/02 379/114.13 |

FOREIGN PATENT DOCUMENTS

| | | |
|---|---|---|
| JP | 10-149369 | 6/1998 |
| JP | 10-334100 | 12/1998 |
| JP | 11-328192 | 11/1999 |
| JP | 2001-306608 | 11/2001 |
| JP | 2003-228676 | 8/2003 |
| JP | 2003-242159 | 8/2003 |
| JP | 2003-331187 | 11/2003 |
| KR | 20020025142 A | 4/2002 |
| KR | 20030096113 A | 12/2003 |
| WO | WO 97/21183 | 6/1997 |
| WO | WO 01/53970 | 7/2001 |

OTHER PUBLICATIONS

U.S. Appl. No. 95/001,073, Reexamination of Stone et al.
U.S. Appl. No. 95/001,069, Reexamination of Stone et al.
U.S. Appl. No. 95/001,068, Reexamination of Stone et al.
U.S. Appl. No. 95/001,061, Reexamination of Stone et al.
Nielsen, Jakob, "Designing Web Ads Using Click-Through Data," (Sep. 2, 2001) downloaded from http://www.useit.com/alertbox/20010902.html, 5 pgs.
"Acronym KeyWord? Search Engine Keyword Advertising," downloaded from. http://www.acronym.com/html/ppc.html, 1 pg.
Clay, Bruce, "Search Engine Optimization," downloaded from http://www.bruceclay.com/webrank.htm, 16 pgs.
"Google AdWords Keyword Match Advertising," downloaded from http://www.searchenginejournal.com/index.ghg?g=347&c=1, 2 pgs.
Gerhart, Andrew, "Keyword Testing for Increased Search Engine Conversion Rates," (Jul. 15, 2002) downloaded from http://www.searchengineguide.com/gerhart/2002/0715_agl.html, 4 pgs.
Fortanet, I., Palmer, J.C., Posteguillo, S., "Netvertising: content-based subgeneric variations in a digital genre," System Sciences, 1998, Proceedings of the Thirty-First Hawaii International Conference on IEEE, (Jan. 6-9, 1998) 1 pg.
Examiner First Report on Australian Patent Application No. 2004311451, dated Dec. 20, 2007 (2 pgs.).
Notification of the First Office Action for Chinese Patent Application No. 200480042062.3, dated May 9, 2008 (3 pgs.) with translation (5 pgs.).
Notice of Preliminary Rejection for Korean Patent Application No. 10-2006-7015511, dated Jul. 31, 2008 (5 pgs.) with translation (5 pgs.).
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive fromwww.Archive.org, Apr. 12, 1997 and Feb. 1, 1997.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.

(56) References Cited

OTHER PUBLICATIONS

Business Wire, "Global Network, Inc. Enters Into Agreement in Principle With Major Advertising Agency," Oct. 4, 1999.
Zeff, R. et al., Advertising on the Internet, 2na Ed., John Wiley & Sons, 1999.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
Statement Regarding References in 1449 Form.
Notice of Reasons for Rejection for Japanese Patent Application No. 2006-547590, dated Feb. 17, 2009 (3 pgs.) with translations (3 pgs.).
Notice of Final Rejection for Korean Patent Application No. 10-2006-7015511, dated Feb. 4, 2009 (3 pgs.) with translation (3 pgs.).
Notice of Preliminary Rejection for Korean Patent Application No. 10-:2 006-7015511, dated Apr. 28, 2009 (3 pgs.) with translation (3 pgs.).
Examiner's Report No. 2 for Australian Patent Application No. 200431 J 451, dated May 8, 2009 (2 pgs.).
First Examination Report for Indian Patent Application No. 2811/CHENP/2006-KM, dated Dec. 24, 2008 (2 pgs.).
Decision of Rejection for Japanese Patent Application No. 2006-547590, dated Sep. 29, 2009 (3 pgs.) with translation (3 pgs.).
Notification of the Second Office Action for Chinese Patent Application No. 200480042062.3, dated Oct. 16, 2009 (7 pgs.) with translation (10 pgs.).
Canadian Office Action for Canadian Patent Application No. 2,552,236, dated Feb. 5, 2010 (2 pgs.).
Supplementary European Search Report for European Patent Application No. 04816010.5-•1238, dated Mar. 5, 2010 (3 pgs.).
Notice of Reasons for Rejection for Japanese Patent Application No. 2010-01809, dated Jun. 22, 2010 (3 pgs.) with translation (4 pgs.).
Office Action for European Patent Application No. 04 816 010.5, dated Jun. 30, 2010 (4 pgs.).
Notification of Third Office Action for Chinese Patent Application No. 200480042062.3, dated Aug. 9, 2010 (4 pgs.) with translation (5 pgs.).
Notification of the Fourth Office Action for Chinese Patent Application No. 200480042062.3, dated Feb. 10, 2011 (8 pgs.) with translation (4 pgs.).
Rejection Decision for Chinese Patent Application No. 200480042062.3, dated Jun. 24, 2011 (9 pgs.) with translation (6 pgs.).
Official Letter of Inquiry for Japanese Patent Application No. 2006-547590, dated Jun. 28, 2011 (3 pgs.) with translation (4 pgs.).
Decision of Rejection for Japanese Patent Application No. 2010-018809, dated Jul. 12, 2011 (2 pgs.) with translation (2 pgs.).
Examiner's Report for Canadian Patent Application No. 2,552,236, dated Jan. 9, 2012 (2 pgs.).
First Office Action for Japanese Patent No. 2006-547590, dated Mar. 6, 2012 (4 pgs.) with translation (5 pgs.).
Official Letter of Inquiry for Japanese Patent Application No. 2010-18809, dated May 22, 2012 (3 pgs.) with translation (3 pgs.).
Watanabe, Takahiro, "Overture Sponsored Search VS Google Ad Words—Outstanding Results Produced by Several Tens of Thousands of Yen per Month! Use Sponsored Search Service Perfectly-," iNternet Magazine 2nd Stage, Impress Corporation, No. 108, pp. 106-113 (Jan. 1, 2004).
First Office Action for Japanese Patent Application No. 2010-18809, dated Jan. 8, 2013 (5 pgs.) with translation (6 pgs.).
First Office Action for Japanese Patent Application No. 2006-547590, dated Jan. 8, 2013 (7 pgs.) with translation (9pgs.).

\* cited by examiner

SUGGESTING AND/OR PROVIDING TARGETING CRITERIA FOR ADVERTISEMENTS

0. RELATED APPLICATIONS

This application is a continuation of U.S. patent application Ser. No. 13/784,401, filed on Mar. 4, 2013; which is a continuation of U.S. patent application Ser. No. 10/750,451 (referred to as "the '451 application" and incorporated herein by reference), titled "SUGGESTING AND/OR PROVIDING TARGETING CRITERIA FOR ADVERTISEMENTS," filed on Dec. 31, 2003 (now U.S. Pat. No. 8,392,249) and listing Ross KONINGSTEIN, Valentin SPITKOVSKY, Georges R. HARIK and Noam SHAZEER as the inventors.

1. BACKGROUND OF THE INVENTION

1.1 Field of the Invention

The present invention concerns advertising. In particular, the present invention concerns improving keyword targeting used to serve ads.

1.2 Background Information

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Website.

Regardless of the strategy, Website-based ads (also referred to as "Web ads") are typically presented to their advertising audience in the form "banner ads" (i.e., a rectangular box that may include graphic components). When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection).

Advertisers may judge the efficacy of an advertising campaign using a number of measurable or determinable user behaviors, such as click-throughs, click-through rates, conversions, conversion rates, etc. The ratio of the number of click-throughs to the number of impressions of the ad (i.e., the number of times an ad is displayed) is commonly referred to as the "click-through rate" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed or otherwise rendered) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Website-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

1.2.1 Targeted Ad Serving

A popular recent trend has been to target ads to users based on some type of user request, such as the submission of a search query to a search engine. For example, the Google search engine Website allows advertisers to specify keywords for triggering the serving of an ad or a group of ads when those keywords, or some derivative thereof, are included in a search query. Unfortunately, it can often be difficult for advertisers to specify appropriate keywords, or some other targeting criteria, for a given ad. Such poor targeting may lead to inappropriate ad serves ("over-serving"), or no ad servers when appropriate ("under-serving").

1.2.1.1 Over-Serving and Consequent Problems

In ad serving systems in which advertisers pay per selection, rather than per impression, most advertisers are not troubled if they get non-relevant impressions. After all, if users don't select the ads, the impressions are free. Some Website hosts have chosen to place advertising revenues over the interests of users. One such Website is "Overture.com", which hosts a so-called "search engine" service returning advertisements masquerading as "search results" in response to user queries. The Overture.com website permits advertisers to pay to position an ad for their Website (or a target Website) higher up on the list of purported search results. If schemes where the advertiser only pays if a user selects the ad (i.e., cost-per-click) are implemented, the advertiser lacks incentive to target their ads effectively, since a poorly targeted ad will not be selected and therefore will not require payment. Consequently, high cost-per-click ads show up near or at the top, but do not necessarily translate into real revenue for the ad publisher because viewers don't click on them. Furthermore, ads that users might otherwise select may be further down the list, or not on the list at all, and so relevancy of ads is compromised. Accordingly, such systems are certainly not good from the standpoint of users seeking relevant information, since their interests are subordinated to those of the advertisers. However, when such systems employ a cost per click payment scheme rather than a cost per impression scheme, they are not particularly efficient from the standpoint of generating revenue for the ad server.

Some ad serving systems, such as Adwords Select from Google for example, will shut off low click-through keywords, and account for the performance of ads in serving decisions. In such systems, advertisers may need to pick relevant keywords for their ads.

Further, sometimes targeting criteria will trigger the serving of an ad at an inappropriate or undesirable time. For example, although a keyword targeting criteria (e.g., "travel") of an ad (e.g., an ad for business travel) may literally match a term of a user's search query (e.g., "space travel"), serving the ad (e.g., an ad for business travel) might sometimes be inappropriate or undesirable. This could affect the performance of the ad. In some advertising systems, poor ad performance can result in increased costs and/or the ad being dropped.

1.2.1.2 Under-Serving and Consequent Problems

In the case where an advertiser did not consider a particular targeting criteria for its ad, there could be a lost opportunity to serve an otherwise relevant ad for presentation to an end user because of the missing targeting criteria. For example, an advertiser selling "Star Trek" DVDs may not think of using "Captain Kirk" as a targeting criteria, although such a query would likely be indicative of a user with an interest in "Star Trek" movies. This example illustrates problems associated with missed opportunities, where an ad isn't served when doing so would be appropriate or desirable.

From the perspective of the entity serving ads, missed opportunities to serve a relevant ad are lost opportunities to generate revenue. For example, with some ad serving systems, such as Adwords Select from Google for example, many search result pages served may contain no (or few) ads. If such opportunities to show an ad are missed, not only are they lost forever as a source of revenue, but nothing is learned about what ads could be shown for these searches, consequently forsaking future revenue.

From the perspective of an advertiser, not only does the advertiser miss an opportunity to serve its ad, but if its ad were served pursuant to a match with a less popular keyword, the cost of such an ad serve may be less expensive than a more popular keyword with more competing advertisers.

1.2.1.3 Selecting Effective Serving Criteria Such as Keywords

As the sections on over-serving and under-serving above illustrate, poorly targeted ads are bad for users, advertisers, and ad serving systems. Conversely, well targeted ads are relevant and therefore should perform well and enhance a user's experience. Unfortunately, it may be difficult for advertisers to learn how to pick good keyword targets.

Selecting good keyword targets may come with a difficult learning curve, and certain problems often occur repeatedly. For example, an advertiser may pick its own keywords, its ads may run for a brief time, and several keywords (or their whole campaign) may get shut off because of low performance (e.g., a low click-through rate). Such advertisers may then request keywords, and recommendations (e.g., from customer service or from an automated keyword recommendation facility) may be provided to the advertiser. However, if the keyword recommendations aren't good, the ad can continue to perform poorly, and get shut off again. This learning process may become a source of advertiser frustration. Such frustration can lead to advertisers to stop using an ad serving system altogether, to reduce their use of an ad serving system, or not to expand their use of an ad serving system. Even if the advertiser sticks with the ad serving system, a process which slowly converges on a good keyword targeting slows the sales cycle.

Accordingly, there is a need to improve the performance of online advertising. More specifically, there is a need to increase the relevancy of ads, and to exploit opportunities to serve an ad that might otherwise be missed. Doing so could increase the revenue of an ad serving entity, improve the experience of users, and improve efficacy and cost of advertiser's ads.

2. SUMMARY OF THE INVENTION

The present invention may be used to help advertisers better target the serving of their ads by having more keyword suggestions that are category-aware (and field-proven). For advertisers with new campaigns, the advertiser can enter ad information, such as a creative for example. The keyword facility may use this entered information as seed information to infer one or more categories. It may then request that the advertiser confirm or deny some basic feedback information (e.g., categories, Webpage information, etc.). For example, an advertiser may be provided with candidate categories and may be asked to confirm (e.g., using checkboxes) which of the categories are relevant to their ad. In one embodiment, the ad server system may then automatically provide keywords to the advertiser for its ad.

In one embodiment of the present invention, the ad server system can run a trial on determined keywords. It may then provide recommendations to the advertiser using results of the trial. Some recommendations may be as simple as the recommendation of negative keywords (which will increase the customer's click-through rate, which may save it from being shut off, and/or allow the advertiser to get clicks at a lower CPC while maintaining their rank). Advertisers that have been running ads can request keyword suggestions. The ad serving system could contact such advertisers (e.g., via e-mail) with notices like, "you could get X more clicks at your current CPC if you used {suggested keywords}," or "using {suggested negative keywords} as negative keywords, you could get your clicks cheaper", or "use {suggested keywords} to avoid shut off," etc. Keyword suggestions may also be used for building new campaigns and projecting inventory available. For existing campaigns that are not meeting targets, keyword suggestions make it easy to find and add more keywords.

Thus, one method consistent with the present invention may include harvesting keyword targets, building category pools, augmenting ad targeting information with information from similar advertisers (e.g., linked by advertiser "category" and keyword intersection), providing category recommendations and accepting advertiser feedback (e.g., decline, accept, confirm, etc.) with a user interface. It may also include running test ads for advertisers on unused inventory, by using category pools or competitor pre-qualified keywords, and suggesting keywords that performed well on the test ads to the end user. In addition to helping advertisers to select targeting keywords, one method consistent with the present invention may also suggest negative category targeting (and negative keyword targeting using the negative categories).

3. BRIEF DESCRIPTION OF THE DRAWINGS

4. DETAILED DESCRIPTION

The present invention may involve novel methods, apparatus, message formats and/or data structures for suggesting and/or providing keywords used to target ads (referred to as "targeting keywords"). The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in § 4.1. Then, exemplary embodiments of the present invention are described in § 4.2. Examples illustrating operations of exemplary embodiments of the present invention are described in § 4.3. Finally, some conclusions regarding the present invention are set forth in § 4.4.

4.1 Environments in which, or with which, the Present Invention May Operate

4.1.1 Exemplary Advertising Environment

Figure 1:
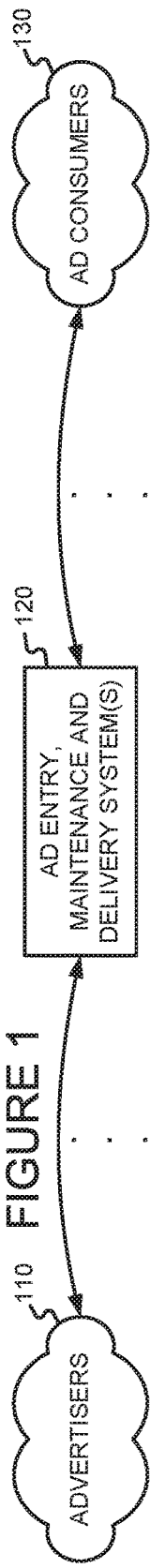
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the user. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results. Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

4.1.2 Exemplary Ad Entry, Maintenance and Delivery Environment

Figure 2:
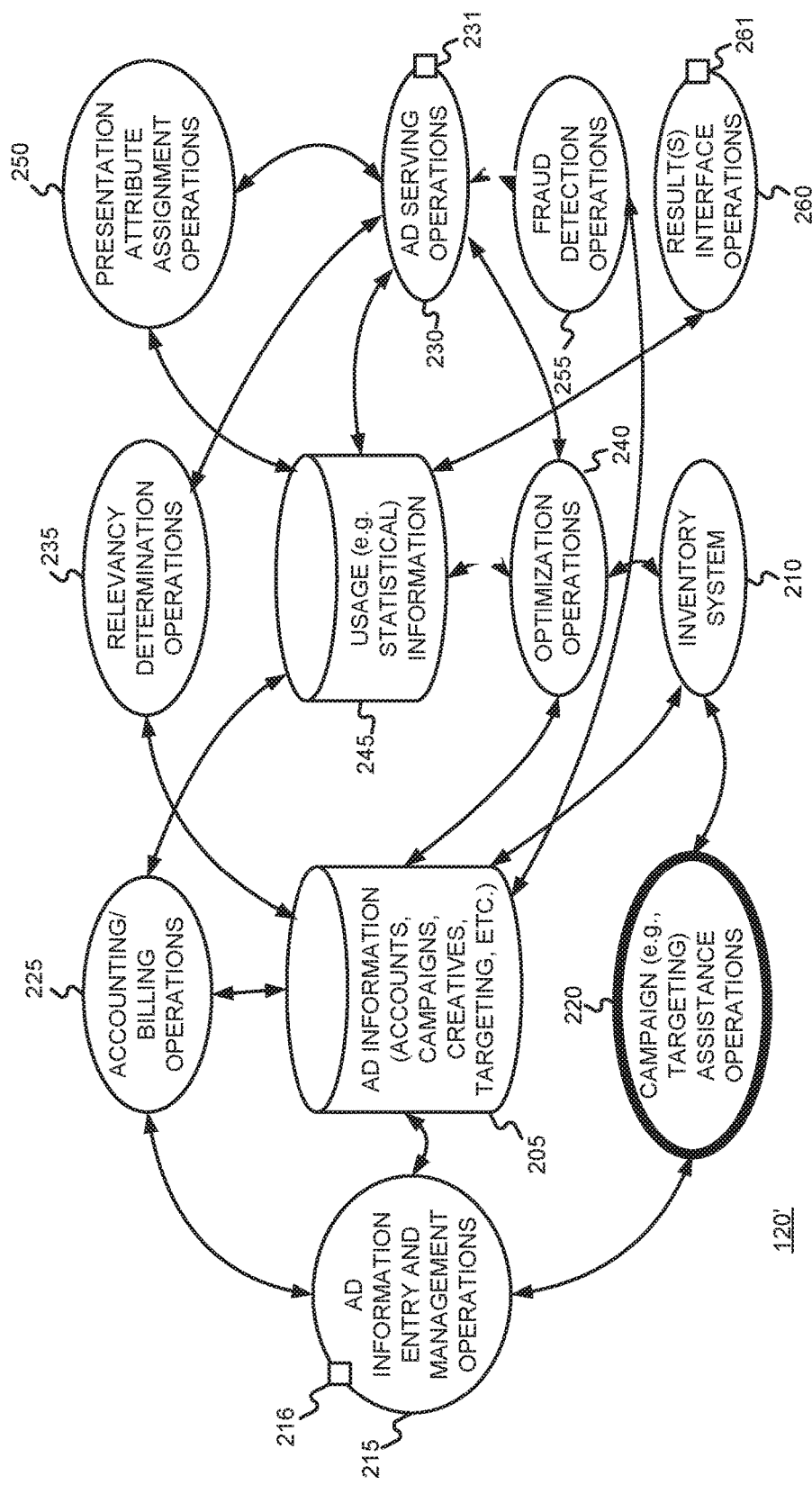
FIG. 2 is a bubble chart of an exemplary advertising environment in which, or with which, the present invention may operate.

FIG. 2 illustrates an exemplary ad system 120' in which, or with which, the present invention may be used. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geotargeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost (cost per click-though, cost per conversion, etc.). Alternatively, or in addition, each ad group may include an average cost (e.g., average cost per click-through, average cost per conversion, etc.). Therefore, a single maximum cost and/or a single average cost may be associated with one or more keywords. As stated, each ad group may have one or more ads or "creatives" (That is, ad content that is ultimately rendered to an end user). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. The ad serving operations 230 may then use relative presentation attribute assignment operations 250 to order the presentation of the ads to be returned. The accounting/billing operations 225 may be used to track charges related to the serving of advertisements and to bill advertisers. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

As will be appreciated from the description to follow, various aspects of the present invention may be applied to campaign targeting assistance operations 220.

4.1.3 Definitions

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

In targeted advertising, a "targeting keyword" may be an identified keyword or group of keywords (including phrases, or negative keywords), that target the serving of the ad by specifying (or restricting) when the ad is eligible to be shown. In some ad serving systems, an advertiser can specify how its keywords are to be used in ad serving decisions by specifying match types. For example, if an advertiser specifies a "broad" match type (which may be a default setting), the advertiser may include general keyword or keyword phrases (such as "tennis shoes" for example) in its keyword list. In this example, the advertiser's ads are eligible for serving when users search for "tennis" and "shoes," in any order, and possibly along with other terms. The advertiser's ads might also be subject to expanded matches, including plurals and relevant variations. Since other advertisers may be competing for the same broad-matched keyword combinations that trigger the serving of ads, using broad targeting keywords may increase cost amounts. Using exact, phrase, or negative matches (discussed below) can help advertisers minimize costs. An advertiser may specify a "phrase" match type (e.g., by entering their keyword in quotation marks, as in "tennis shoes"). In this case, its ad will be eligible for serving when a user searches on the phrase "tennis shoes," in this order, and possibly with other terms in the query. For example, the advertiser's ad will be eligible for serving for the query "red tennis shoes" but not for "shoes for tennis." Phrase matching is more targeted than broad matching, but slightly more flexible than exact matching. An advertiser may specify an "exact" match type (e.g., by surrounding its keywords in brackets—such as [tennis shoes]). In this case, its ads will be eligible for serving when users search for the specific phrase "tennis shoes," in this order, and without any other terms in the query. For example, the advertiser's ad won't be eligible for serving for the query "red tennis shoes." An advertiser may also specify "negative" keywords. For example, if an advertiser's keyword is tennis shoes and it adds the negative keyword –red, its ad will not be eligible for serving if a user searches on "red tennis shoes." Naturally, other types of targeting keywords are possible.

"Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, etc. It may include latitude and/or longitude, or a range thereof. It may include information, such as an IP address, from which a user location can be estimated.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information. It may also include a user's geolocation, or an estimation of the user's geolocation.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in § 4.2.

4.2 Exemplary Embodiments

As indicated above, the present invention may be used to suggest and/or provide keywords used to target ads. Exemplary embodiments for associating keywords and categories are described in § 4.2.1 below. Then, exemplary embodiments for using such associations to suggest and/or provide keywords is described in § 4.2.2. Some possible refinements and alternative embodiments are discussed in § 4.2.3. Finally, exemplary apparatus that may be used to effect various aspects of the invention are described in § 4.2.4.

4.2.1 Associating Keywords and Categories

Figure 3:
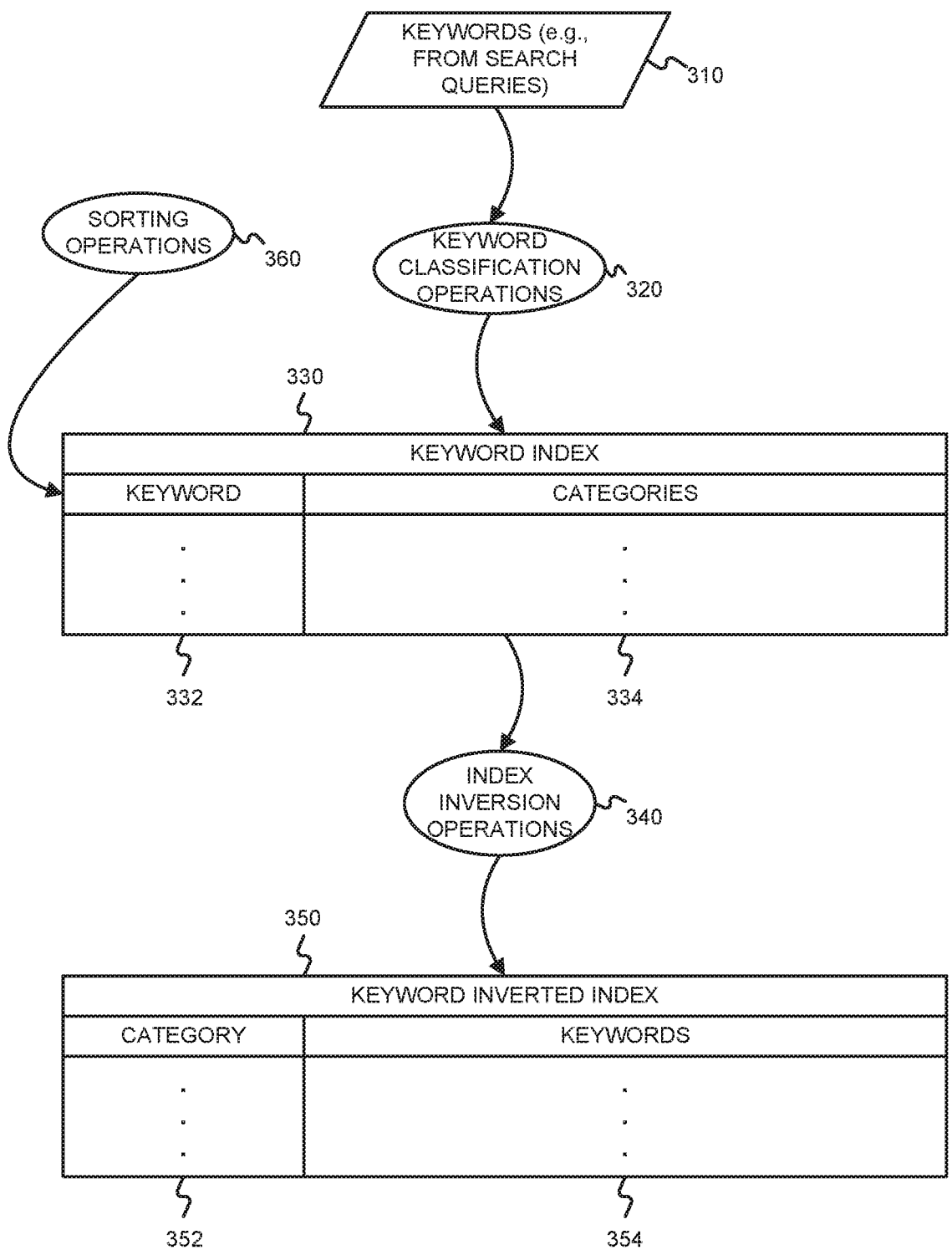
FIG. 3 is a bubble chart of operations, consistent with the present invention, that may be used to associate keywords and categories in an online advertising environment, such as the one in FIG. 2.

FIG. 3 is a bubble chart of operations that may be performed, and information that may be used or stored, consistent with the present invention. More specifically, the operations of FIG. 3 may be used to generate associations between keywords and categories. For example, keyword classification operations 320 may be used to generate a keyword index 330 from keywords 310. The keywords 310 may be from search queries for example. The keyword index 330 may use a keyword 332 as a lookup key to one or more associated categories 334. Sorting operations 360 may be used to sort the entries of the keyword index 330. For example, the entries may be sorted based on frequency of use of keywords 332. Finally, index inversion operations 340 may be used to generate a keyword inverted index 350 from the keyword index 330. The keyword inverted index 350 may use a category 352 as a lookup key to associated keywords 354.

Figure 4:
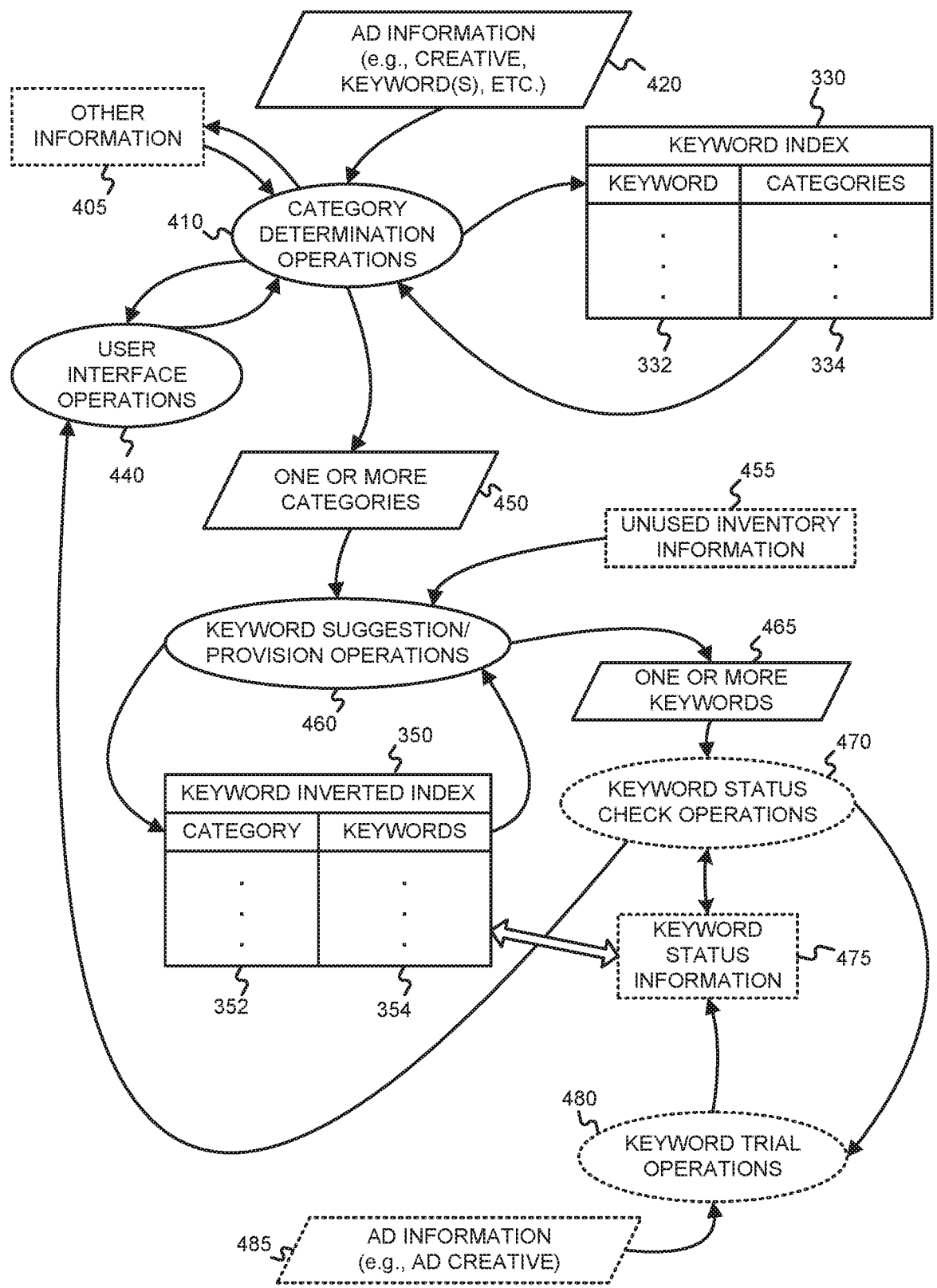
FIG. 4 is a bubble chart of operations, consistent with the present invention, that may be used to suggest and/or automatically supply keywords for targeting an ad.

4.2.2 Using Keyword and Category Associations to Suggest and/or Provide Keywords FIG. 4 is a bubble chart of operations, consistent with the present invention, that may be used to suggest and/or automatically supply keywords for targeting an ad. Category determination operations 410 may use ad information 420 to determine one or more categories 450. The category determination operations 410 may determine one or more categories using one or more of the following techniques. For example, using one technique, if the ad information 420 includes one or more keywords, the category determination operations may use keyword-category association information, such as a keyword index 330, to determine one or more categories 334 associated with the one or more keywords. The one or more categories determined may be provided to user interface operations 440. The user interface operations 440 may be used to (i) present determined categories to an advertiser, or its representative (simply referred to as "advertiser"), and to receive feedback concerning the presented categories from the advertiser. For example, a number of candidate categories may be presented to an advertiser. In response, the advertiser can indicate which of the candidate categories are appropriate and/or inappropriate. In another technique, the ad information 410 may include a creative or a link to a landing Webpage. The category determination operations 410 may use such information, as well as other information 405, to determine one or more categories. (See, for example, U.S. patent application Ser. No. 10/419,692 (incorporated herein by reference), titled "DETERMINING CONTEXTUAL INFORMATION FOR ADVERTISEMENTS AND USING SUCH DETERMINED CONTEXTUAL INFORMATION TO SUGGEST TARGETING CRITERIA AND/OR IN THE SERVING OF ADVERTISEMENTS," filed on Apr. 21, 2003 and listing Amit Singhal, Mehran Sahami, Amit Patel and Steve Lawrence as inventors. That application stated that generated ad context information may be used to help advertisers consider additional serving constraints, such as keywords for example.)

Regardless of the technique or techniques used, one or more categories 450 are generated. Keyword suggestion/provision operations 460 may use the one or more generated categories 450, to generate one or more keywords 465. For example, the keyword suggestion/provision operations 460 may use the one or more categories 450 as keys 352 to lookup keywords 354 in a keyword inverted index 350. The determined keywords 476 may be provided to the user as suggested keywords, or may automatically be associated with an ad as targeting keywords. However, in one embodiment of the present invention described below, the keywords are tested for qualification first.

In one embodiment of the present invention, the keyword suggestion/provision operations 460 may use unused inventory information 455 in its determination of keywords. For example, such unused inventory information 455 may associate keywords with a number of unused ad spots over a period of time. Generated targeting keywords 465 may be ordered based on number of unused ad spots associated with the keywords. In this way, keywords that, if used as targeting keywords, would fill many otherwise unused ad spots may be preferred over those that would fill few otherwise unused ad spots.

Figure 5:
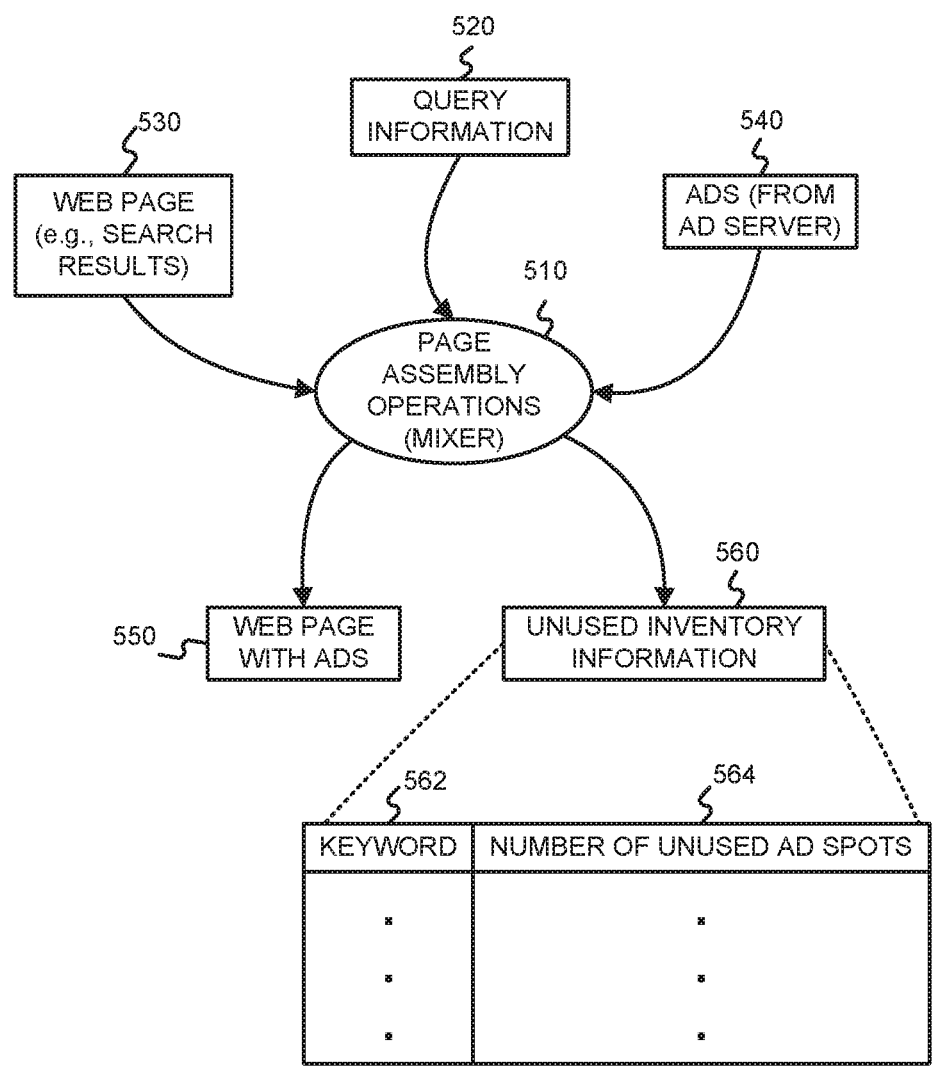
FIG. 5 is a bubble chart of operations, consistent with the present invention, that may be used to compile unused ad inventory information.

Referring to FIG. 5, unused inventory information 560 may be compiled by page assembly operations 510. These operations 510 basically mix Web page information (e.g., search results) 530, query information 520 and ads (e.g., from an ad server) 540 to generate a Web page with ads 550. Suppose that the Web page has ten (10) ad spots and ten (10) ads are served. In this case, there are no unused ad spots, and the information 560 need not be updated. If, however, the Web page has ten (10) ad spots and only three (3) ads are served, there are seven (7) unused ad spots. In this case, entries of the information 560 corresponding to keywords 562 found in the query 520 may have an associated number of unused ad spots 564 increased. Thus, the number of unused ad spots 564 may correspond to a sum of unused ad spots over a number of page serves. The number 564 may be a running total, may have a time windowing function applied (e.g., based on page serves for the past two weeks), etc. The unused inventory information 560 may be ordered from time to time based on the number of unused ad spots.

Referring back to FIG. 4, as described above, although the determined keywords can simply be suggested to the advertiser, or provided to the ad as keyword targets, it may be desirable to test the keywords for qualification first. In an embodiment in which keywords are tested for qualification, keyword status check operations 470 may check keyword status information (e.g., one or more of: qualified for use as ad targeting information without need for advertiser approval; qualified for use as ad targeting information but only with advertiser approval; neither qualified, nor disqualified; or disqualified for use as ad targeting) information of the keyword(s) 465 under consideration. The keyword status information 475 may be maintained for a keyword in general (e.g., without regard to a category of the ad), and/or may be maintained for a keyword in the context of one or more particular categories. Although not shown in FIG. 4, the keyword status information 475 may be stored in, or otherwise linked with, the keyword inverted index 350. If the keyword is qualified for use as ad targeting information without the need for advertiser approval, it may be added to the ad information as a targeting keyword. If the keyword is qualified for use as ad targeting information but only with advertiser approval, it may be provided to user interface operations 440 for presentation to the advertiser. If the keyword is disqualified, it should be dropped from consideration. Finally, if the keyword is neither qualified, nor disqualified (e.g., if there is no qualification information for the keyword), it may be passed to keyword trial operations 480.

The keyword trial operations 480 may use the keyword as a targeting keyword to serve an ad 485 to see how it will perform. The trial may be limited to otherwise unused inventory. Generally, if the ad performs well, it may be qualified, if it performs poorly, it may be disqualified, and the keyword status information 475 may be updated appropriately. Various status levels may be associated with various levels of trial performance. Other ways of qualifying or disqualifying a keyword may be used. If there are a number of keywords that are under consideration but that don't have qualification information, keyword trial operations 480 may try the keywords with the highest amount of unused inventory first. Then additional keywords may be tried. In one embodiment of the present invention, the additional keywords may be from those with more unused inventory to those with less unused inventory.

Having introduced operations that may be performed in accordance with the present invention, a number of exemplary methods for performing the operations are now described.

Figure 6:
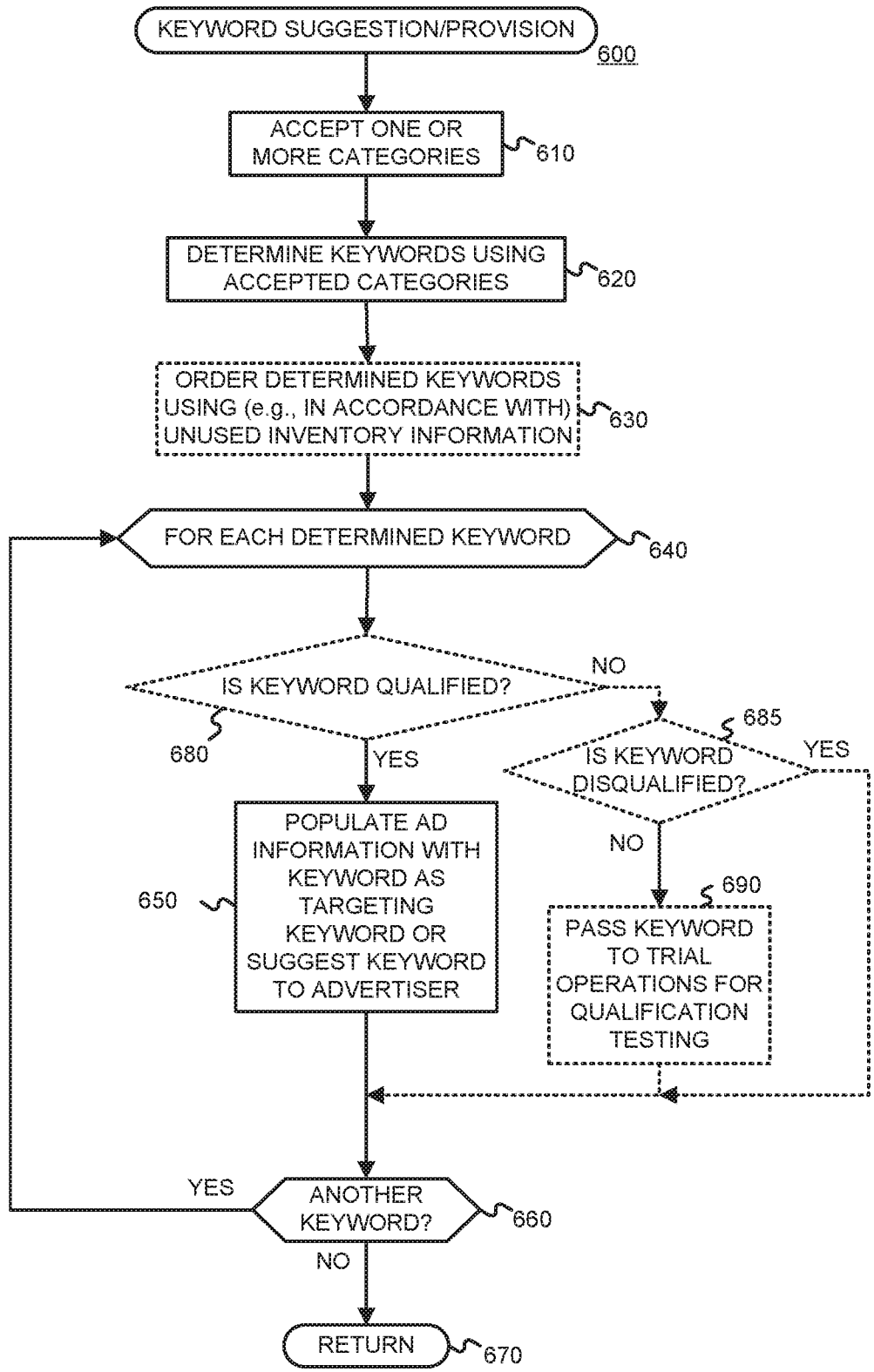
FIG. 6 is a flow diagram of an exemplary method that may be used to suggest or provide keywords in a manner consistent with the present invention.

FIG. 6 is a flow diagram of an exemplary method 600 that may be used to perform keyword suggestion/provision operations 460 in a manner consistent with the present invention. One or more categories are accepted. (Block 610) One or more keywords are determined using the accepted categories. (Block 620) Recall that this may be done using a keyword index 330. The determined keywords may be ordered using unused inventory information. (Block 630) In this way, keywords that, if used as targeting keywords, would fill more ad spots may be considered first. As indicated by loop 640-660, a number of acts may be performed for each of the determined keywords, or at least of the determined keywords under consideration. In one embodiment of the present invention, the keyword is simply suggested to the advertiser or provided as a targeting keyword. (Block 650) In an alternative embodiment of the present invention, keyword status is checked. For example, it may be determined whether or not the keyword is qualified. (Decision block 680) If so, the method 600 continues to block 650 already discussed. If the keyword is not qualified (and hasn't been disqualified), the password may be passed to trial operations for qualification testing. (Block 690) Once all of the keywords have been processed, the method 600 is left. (Node 670)

Figure 7:
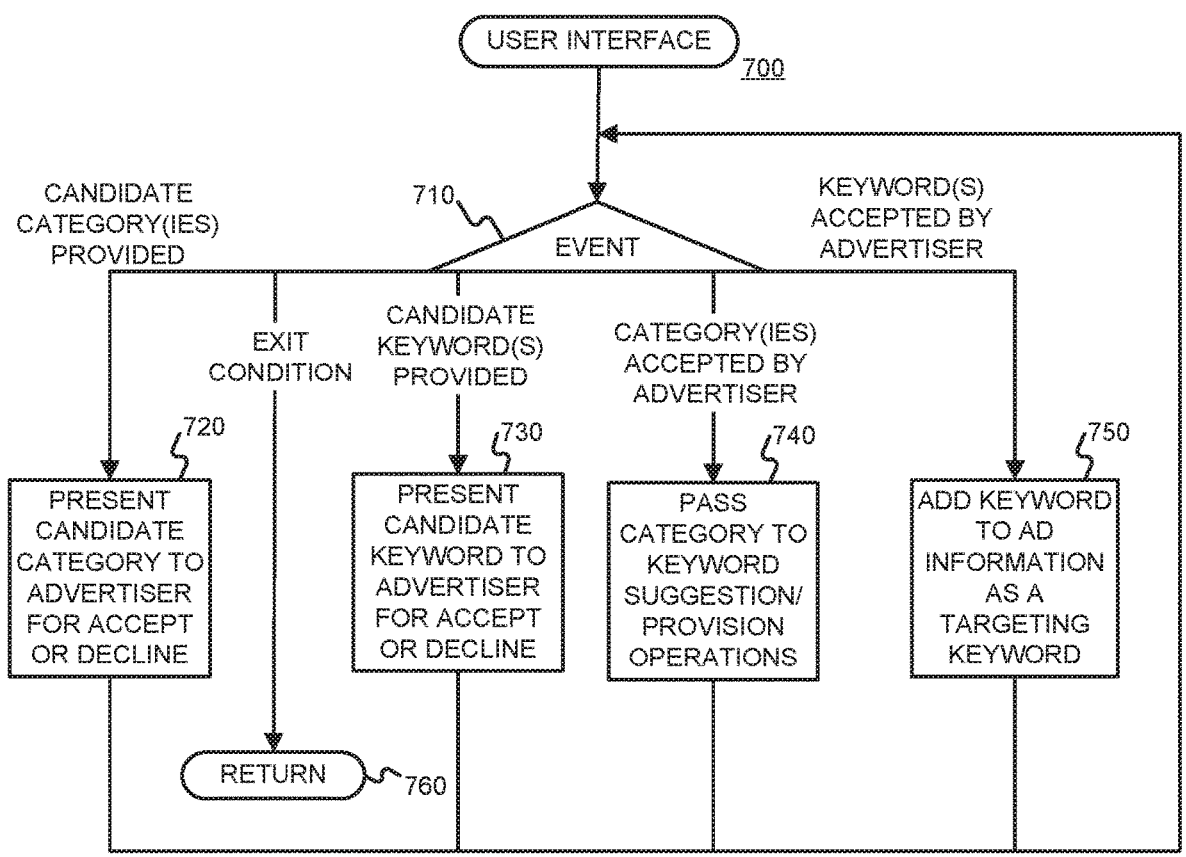
FIG. 7 is a flow diagram of an exemplary method that may be used to support a user interface in a manner consistent with the present invention.

FIG. 7 is a flow diagram of an exemplary method 700 that may be used to perform user interface operations 440 in a manner consistent with the present invention. As indicated by block 710, various branches of the method 700 may be performed in response to the occurrence of various different events. More specifically, if one or more candidate categories are provided (e.g., by category determination operations 410), the candidate category(ies) may be presented to the advertiser to accept or decline (Block 720) before the method 700 branches back to block 710. If one or more candidate keyword(s) are provided (e.g., by keyword suggestion operations 460), the candidate keyword(s) may be presented to the advertiser to accept or decline (Block 730) before the method 700 branches back to block 710. If one or more categories are accepted by the advertiser, the category(ies) may be passed to keyword suggestion/provision operations, such as those 460 of FIG. 4 (Block 740) before the method 700 branches back to block 710. If one or more keyword(s) are accepted by the advertiser, the keyword (s) may be added to ad information as a targeting keyword (Block 750) before the method 700 branches back to block 710. If an exit condition occurs, the method 700 may leave. (Node 760)

Figure 8:
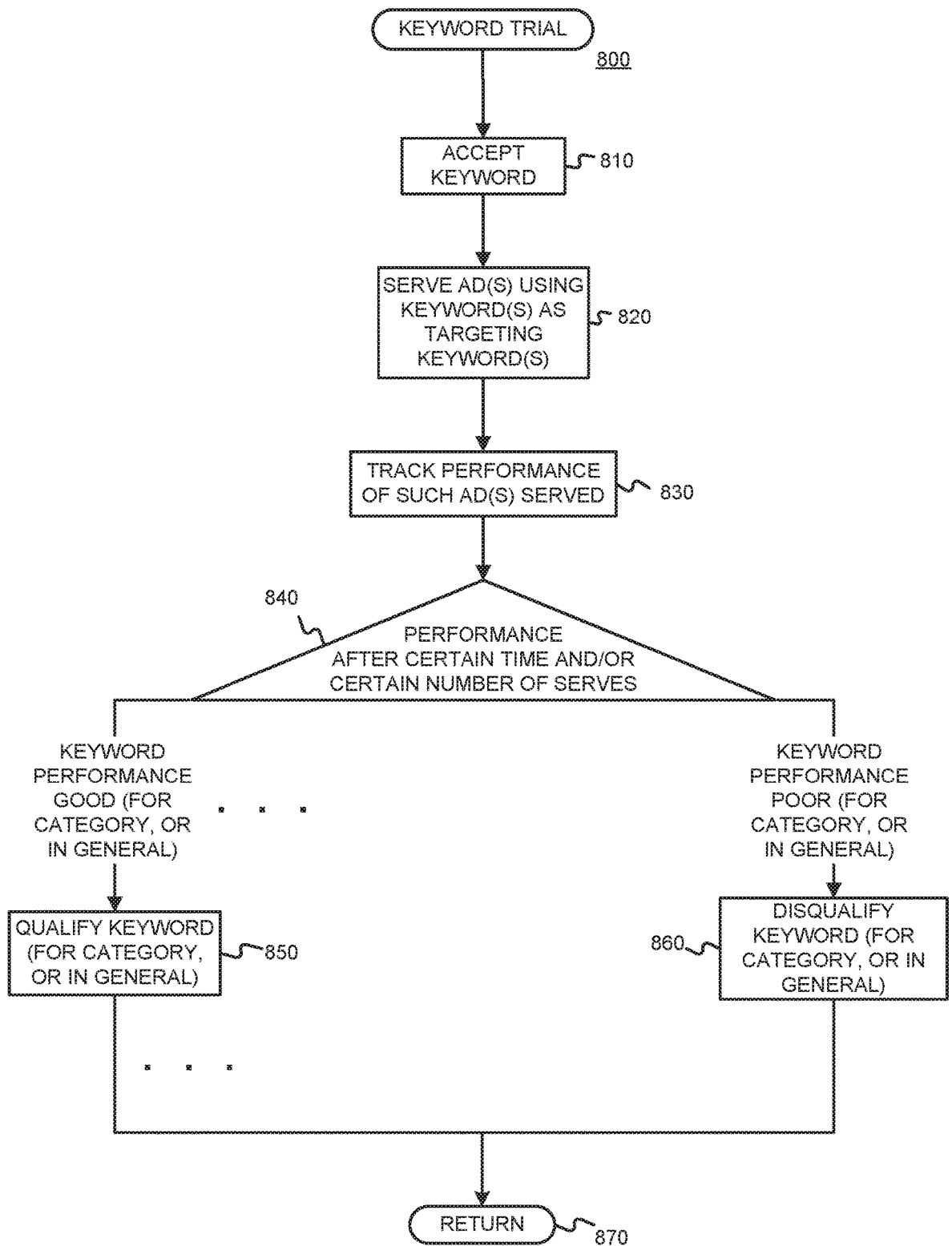
FIG. 8 is a flow diagram of an exemplary method that may be used to test keywords in a manner consistent with the present invention.

FIG. 8 is a flow diagram of an exemplary method 800 that may be used to try keywords for qualification as targeting keywords in a manner consistent with the present invention. A keyword (or more than one keyword) is accepted. (Block 810). The trial operations may use one or more keywords as targeting keywords in the serving of an ad (or even a group of ads) (Block 820) and the performance of such ads may be tracked (Block 830). In one embodiment of the present invention, the serving of the ads using trial targeting keyword (s) may be limited to ad spots (inventory) that otherwise would be unused. After a certain amount of time and/or after a certain number of such ad serves, various branches of the method 800 may be performed responsive to various different performance levels. If a keyword performs well (e.g., in general, or for a particular category), it may be marked as a keyword to be suggested, and/or as a qualified keyword (e.g., in general, or for the particular category) (Block 850) before the method 800 is left (Node 870). In fact, generic creatives (for example, creative templates with certain advertiser information inserted) with qualified targeting keywords could be subject to expedited approvals. If, on the other hand, a keyword does not perform well (e.g., in general, or for a particular category), it may be disqualified and marked as unusable (e.g., in general, or for the particular category) (Block 860) before the method 800 is left (Node 870). In this way, advertisers can avoid the frustration of targeting their ads using poorly performing keywords. Although not shown, keywords can be assigned various different status levels associated with various different levels or performance. In one embodiment, performance for one or more keywords may be considered to be good if ads served pursuant to using the keyword(s) as targeting keywords perform (e.g., have a click-through rate) comparable to what salespeople and/or customers already think are the best keywords (e.g., the keywords that they are already using).

4.2.3 Refinements and Alternatives

It may be desirable for the ad serving entity to provide advertisers with opaque ad performance reporting (e.g. not by specific keyword targets). In this way, it may become possible to protect a keyword targeting knowledge base and treat the data as a trade secret. In such an embodiment, advertisers may be satisfied to know that their ad campaign is performing well, without needing to know the details about keyword targeting used. This may make alternative keyword targeting ad serving firms less attractive to an advertiser.

Note that qualified keywords may be any type of keyword, such as negative keywords for example.

4.2.4 Exemplary Apparatus

Figure 9:
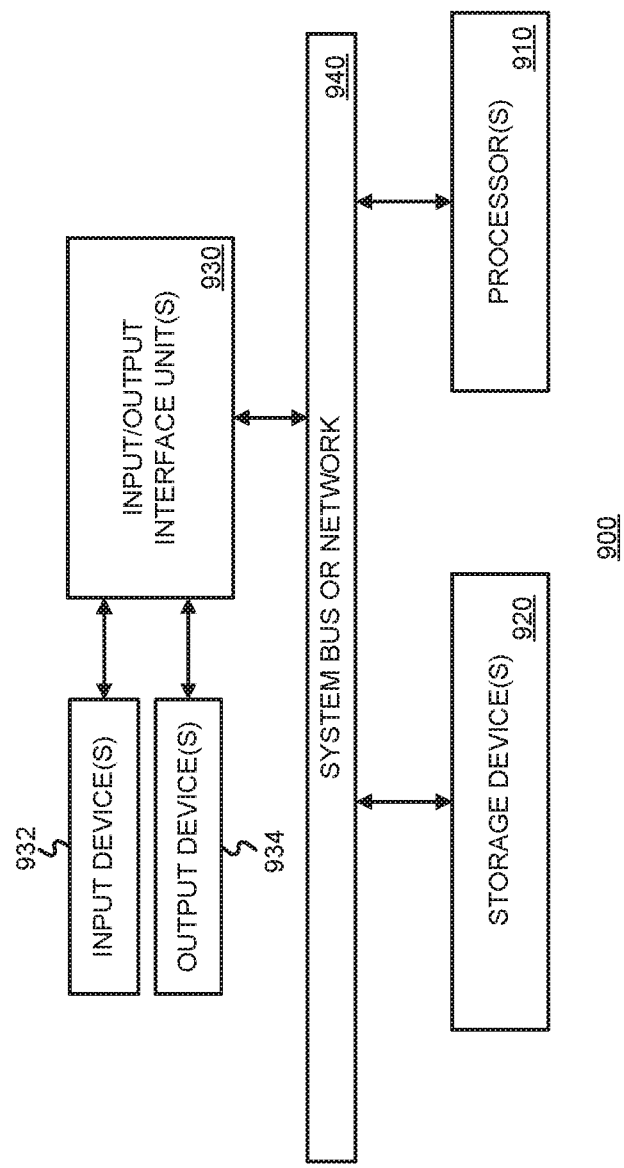
FIG. 9 is a block diagram of apparatus that may be used to effect at least some of the various operations that may be performed consistent with the present invention.

FIG. 9 is high-level block diagram of a machine 900 that may perform one or more of the operations and store various information discussed above. The machine 900 basically includes a processor(s) 910, an input/output interface unit(s) 930, a storage device(s) 920, and a system bus or network 940 for facilitating the communication of information among the coupled elements. An input device(s) 932 and an output device(s) 934 may be coupled with the input/output interface(s) 930.

The processor(s) 910 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the storage device(s) 920 and/or may be received from an external source via an input interface unit 930.

In one embodiment, the machine 900 may be one or more conventional personal computers. In this case, the processing unit(s) 910 may be one or more microprocessors. The bus 940 may include a system bus. The storage devices 920 may include system memory, such as read only memory (ROM) and/or random access memory (RAM). The storage device(s) 920 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 932, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 910 through an appropriate interface 930 coupled to the system bus 940. The output device(s) 934 may include a monitor or other type of display device, which may also be connected to the system bus 940 via an appropriate interface. In addition to (or instead of) the monitor, the personal computer may include other (peripheral) output devices (not shown), such as speakers and printers for example.

4.3 Examples of Operations

An example illustrating exemplary operations of the present invention is now provided. Suppose an advertiser is a Jaguar car dealer. The word "jaguar" may be provided as ad information 420. It may have been taken from entered creative information, information from a landing Webpage specified in the ad, and/or an entered targeting keyword, etc. Category determinations operations 410 may determine various, possibly relevant, categories (and possibly subcategories) such as:

automobiles . . .
computers . . . operating systems . . .
music . . . popular music . . .
music . . . musical instruments . . .
animals . . . mammals . . . felines . . .
movies . . . foreign films . . .
travel . . . resorts . . .
sports & recreation . . . snorkeling . . . scuba . . .
sports & recreation . . . football . . .
pets . . . fish For example, "jaguar" may be relevant to the luxury automobile, the apple Macintosh operating system, the recording artist (Jaguar Wright or Jet Jaguar), the foreign movie (Aimee and Jaguar), the reef in Belize, the football team, or the cichlid fish. The determined categories may be provided to the advertiser via user interface operations 440 and the advertiser may specify that only the automobile category is relevant. The "automobile" category may then be provided to keyword suggestion/provision operations 460 which may generate one or more keywords, such as:

cars, parts, service, dealer, loaner, X-type, S-type, XJ . . .

therefrom. The generated keywords may (a) be added to the ad as targeting keywords, (b) suggested to the advertiser as targeting keywords, or (c) tested if not already qualified. Keyword trial operations 480 may run the ad with the keyword(s) under consideration and track the performance of the ad with respect to one or more of the keyword(s) under consideration. Keywords that perform well may (a) be added to the ad as targeting keywords, or (b) suggested to the advertiser as targeting keywords. Keyword that do not perform well may be disqualified in general, or disqualified for the category automobile.

4.4 Conclusions

As can be appreciated from the foregoing disclosure, the present invention can be used to help online advertisers and entities serving online ads by (i) suggesting or providing targeting criteria to better target the ad and to exploit otherwise missed opportunities to serve relevant ads, and (ii) helping advertisers to eliminate poorly targeted ads. The various techniques described above may be used in combination or in concert. Some embodiments of the present invention unburden advertisers of the need to learn the details of keyword targeting. Moreover, valuable information is learned from queries where few ads are otherwise served. The present invention can improve the targeting of ads, improve customer experience, reduced load on customer support, and increase revenue.

What is claimed is:
1. A method, comprising:
receiving, by one or more computing devices, a submitted keyword that controls distribution of an audio file to content rendering devices;

accessing, by the one or more computing devices, a keyword to category index to identify a category of the keyword;

identifying, by the one or more computing devices, different keywords that are indexed to the category of the keyword as suggested keywords for controlling distribution of the audio file;

ordering, by the one or more computing devices, the suggested keywords based on performance information, including:

receiving, by the one or more computing devices and from a given content rendering device, audio input of one or more search terms;

distributing, by the one or more computing devices, the audio file to the given content rendering device based on the one or more search terms matching one of the suggested keywords;

updating performance information for the one of the suggested keywords based on the distribution of the audio file; and ranking the one of the suggested keywords among others of the suggested keywords based on the updated performance information, wherein ranking the one of the suggested keywords among others of the suggested keywords comprises ranking the one of the suggested keywords based on how many unused presentation spots would be filled using the one of the suggested keywords relative to how many of the unused presentation spots would be filled using each of the others of the suggested keywords; and suggesting one or more highest ranked suggested keywords as a keyword that controls distribution of the audio file.

2. The method of claim 1, comprising:

parsing, from one or more search queries, one or more first keywords;

storing, using a hardware storage device associated with a computer system including a plurality of networked computers, an index data structure including a plurality of entries that each include (1) a keyword of the one or more first keywords, and (2) one or more categories that include the keyword by virtue of the one or more categories being in a same entry of the index data structure, a lookup key of the index data structure being a keyword-based lookup key; and performing an index inversion operation on the index data structure to generate an inverted index data structure.

3. The method of claim 2, wherein the inverted index data structure stores a plurality of entries that each include 1) a category and (2) one or more second keywords associated with the category by virtue of the one or more second keywords being in a same entry of the inverted index data structure, the lookup key being updated to include a category-based lookup key.

4. The method of claim 3, wherein identifying the different keywords comprises:

accessing the inverted index data structure; and identifying the plurality of entries that include the category of the keyword; and identifying the one or more second keywords as the different keywords based on the inclusion of the one or more keywords in the same entry of the inverted index data structure.

5. The method of claim 4 comprising:

performing qualification testing of the one or more second keywords that were identified as the different keywords; and determining that at least one of the different keywords is qualified for use as a keyword that controls distribution of the audio file; and determining that one or more of the different keywords is unqualified for use as a keyword that controls distribution of the audio file, wherein suggesting one or more highest ranked suggested keywords comprises suggesting only the at least one of the different keywords that is qualified for use as a keyword that controls distribution of the audio file.

6. The method of claim 1, wherein the audio file distributed using the suggested one or more highest ranked keywords is distinctively presented relative to search results that are distributed in response to a query matching the suggested one or more highest ranked keywords.

7. An apparatus comprising:

one or more processors; and at least one storage device storing executable instructions that, when executed by the one or more processors, cause the one or more processors to perform operations including:

receiving a submitted keyword that controls distribution of an audio file to content rendering devices; accessing a keyword to category index to identify a category of the keyword;

identifying different keywords that are indexed to the category of the keyword as suggested keywords for controlling distribution of the audio file;

ordering the suggested keywords based on performance information, including:

receiving, from a given content rendering device, audio input of one or more search terms;

distributing the audio file to the given content rendering device based on the one or more search terms matching one of the suggested keywords;

updating performance information for the one of the suggested keywords based on the distribution of the audio file; and ranking the one of the suggested keywords among others of the suggested keywords based on the updated performance information, wherein ranking the one of the suggested keywords among others of the suggested keywords comprises ranking the one of the suggested keywords based on how many unused presentation spots would be filled using the one of the suggested keywords relative to how many of the unused presentation spots would be filled using each of the others of the suggested keywords;

and suggesting one or more highest ranked suggested keywords as a keyword that controls distribution of the audio file.

8. The apparatus of claim 7, wherein the instructions cause the one or more processors to perform operations comprising:

parsing, from one or more search queries, one or more first keywords;

storing, using a hardware storage device associated with a computer system including a plurality of networked computers, an index data structure including a plurality of entries that each include (1) a keyword of the one or more first keywords, and (2) one or more categories that include the keyword by virtue of the one or more categories being in a same entry of the index data structure, a lookup key of the index data structure being a keyword-based lookup key; and performing an index inversion operation on the index data structure to generate an inverted index data structure.

9. The apparatus of claim 8, wherein the inverted index data structure stores a plurality of entries that each include 1) a category and (2) one or more second keywords associated with the category by virtue of the one or more second keywords being in a same entry of the inverted index data structure, the lookup key being updated to include a category-based lookup key.

10. The apparatus of claim 9, wherein identifying the different keywords comprises:
accessing the inverted index data structure; and
identifying the plurality of entries that include the category of the keyword; and
identifying the one or more second keywords as the different keywords based on the inclusion of the one or more keywords in the same entry of the inverted index data structure.

11. The apparatus of claim 10, wherein the instructions cause the one or more processors to perform operations comprising:
performing qualification testing of the one or more second keywords that were identified as the different keywords; and
determining that at least one of the different keywords is qualified for use as a keyword that controls distribution of the audio file; and
determining that one or more of the different keywords is unqualified for use as a keyword that controls distribution of the audio file, wherein suggesting one or more highest ranked suggested keywords comprises suggesting only the at least one of the different keywords that is qualified for use as a keyword that controls distribution of the audio file.

12. The apparatus of claim 7, wherein the audio file distributed using the suggested one or more highest ranked keywords is distinctively presented relative to search results that are distributed in response to a query matching the suggested one or more highest ranked keywords.

13. A non-transitory computer readable medium storing instructions that, when executed by one or more processors, cause the one or more processors to perform operations comprising:
at least one storage device storing executable instructions that, when executed by the one or more processors, cause the one or more processors to perform operations including:
receiving a submitted keyword that controls distribution of an audio file to content rendering devices;
accessing a keyword to category index to identify a category of the keyword;
identifying different keywords that are indexed to the category of the keyword as suggested keywords for controlling distribution of the audio file;
ordering the suggested keywords based on performance information, including:
receiving, from a given content rendering device, audio input of one or more search terms;
distributing the audio file to the given content rendering device based on the one or more search terms matching one of the suggested keywords;
updating performance information for the one of the suggested keywords based on the distribution of the audio file; and ranking the one of the suggested keywords among others of the suggested keywords based on the updated performance information, wherein ranking the one of the suggested keywords among others of the suggested keywords comprises ranking the one of the suggested keywords based on how many unused presentation spots would be filled using the one of the su nested keywords relative to how many of the unused presentation spots would be filled using each of the others of the suggested keywords; and
suggesting one or more highest ranked suggested keywords as a keyword that controls distribution of the audio file.

14. The non-transitory computer readable medium of claim 7, wherein the instructions cause the one or more processors to perform operations comprising:
parsing, from one or more search queries, one or more first keywords;
storing, using a hardware storage device associated with a computer system including a plurality of networked computers, an index data structure including a plurality of entries that each include (1) a keyword of the one or more first keywords, and (2) one or more categories that include the keyword by virtue of the one or more categories being in a same entry of the index data structure, a lookup key of the index data structure being a keyword-based lookup key; and
performing an index inversion operation on the index data structure to generate an inverted index data structure.

15. The non-transitory computer readable medium of claim 8, wherein the inverted index data structure stores a plurality of entries that each include 1) a category and (2) one or more second keywords associated with the category by virtue of the one or more second keywords being in a same entry of the inverted index data structure, the lookup key being updated to include a category-based lookup key.

16. The non-transitory computer readable medium of claim 9, wherein identifying the different keywords comprises:
accessing the inverted index data structure; and
identifying the plurality of entries that include the category of the keyword; and
identifying the one or more second keywords as the different keywords based on the inclusion of the one or more keywords in the same entry of the inverted index data structure.

17. The non-transitory computer readable medium of claim 10, wherein the instructions cause the one or more processors to perform operations comprising:
performing qualification testing of the one or more second keywords that were identified as the different keywords; and
determining that at least one of the different keywords is qualified for use as a keyword that controls distribution of the audio file; and
determining that one or more of the different keywords is unqualified for use as a keyword that controls distribution of the audio file, wherein suggesting one or more highest ranked suggested keywords comprises suggesting only the at least one of the different keywords that is qualified for use as a keyword that controls distribution of the audio file.

18. The non-transitory computer readable medium of claim 7, wherein the audio file distributed using the suggested one or more highest ranked keywords is distinctively presented relative to search results that are distributed in response to a query matching the suggested one or more highest ranked keywords.

\* \* \* \* \*